(12) United States Patent
Xie et al.

(10) Patent No.: US 9,826,063 B2
(45) Date of Patent: *Nov. 21, 2017

(54) CONFIGURING INITIAL SETTINGS OF A NETWORK SECURITY DEVICE VIA A HAND-HELD COMPUTING DEVICE

(71) Applicant: Fortinet, Inc., Sunnyvale, CA (US)

(72) Inventors: Michael Xie, Palo Alto, CA (US); Kai Xu, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/600,593

(22) Filed: May 19, 2017

(65) Prior Publication Data

US 2017/0257463 A1    Sep. 7, 2017

Related U.S. Application Data

(63) Continuation of application No. 13/649,079, filed on Oct. 10, 2012.

(51) Int. Cl.
*H04L 29/08* (2006.01)

(52) U.S. Cl.
CPC ............ *H04L 67/36* (2013.01); *H04L 67/34* (2013.01)

(58) Field of Classification Search
CPC ............ H04L 41/0803; H04L 41/0806; H04L 29/12216; H04L 61/2007
USPC ...................... 709/220, 221, 222; 713/1, 100
See application file for complete search history.

(56) References Cited

U.S. PATENT DOCUMENTS

| 8,001,223 B2 * | 8/2011 | Yeap ................. H04W 36/30 709/221 |
| 8,126,788 B2 | 2/2012 | Pappas et al. |
| 8,381,297 B2 | 2/2013 | Touboul |
| 8,452,860 B2 | 5/2013 | Agarwal et al. |
| 8,479,266 B1 * | 7/2013 | Delker .............. H04L 63/0272 709/221 |

(Continued)

OTHER PUBLICATIONS

Final Rejection for U.S. Appl. No. 13/649,0796, filed Sep. 30, 2014.

(Continued)

*Primary Examiner* — Tae Kim
*Assistant Examiner* — Shiuh-Huei Ku
(74) *Attorney, Agent, or Firm* — Hamilton, DeSanctis & Cha LLP

(57) ABSTRACT

Process, equipment, and computer program product code for configuring a network security device using a hand-held computing device are provided. Default initial settings for a network security device are received by a mobile application running on a hand-held computing device. The default initial settings represent settings that allow the network security device to be remotely managed via a network to which the network security device is coupled. The default initial settings are presented to a network administrator via a touchscreen display of the hand-held computing device. Revisions to or acceptance of the default initial settings are received by the mobile application. The mobile application causes the network security device to be configured with the revised or accepted default initial settings by delivering the settings to the network security device via a management interface to which the hand-held computing device is coupled via a connecting cable.

20 Claims, 9 Drawing Sheets

(56) References Cited

U.S. PATENT DOCUMENTS

| | | | |
|---|---|---|---|
| 2007/0199060 A1* | 8/2007 | Touboul | G06F 21/562 726/11 |
| 2008/0288625 A1 | 11/2008 | Agarwal et al. | |
| 2009/0244598 A1 | 10/2009 | Shen et al. | |
| 2009/0313359 A1 | 12/2009 | Yeap et al. | |
| 2012/0032945 A1* | 2/2012 | Dare | G06F 3/0481 345/418 |
| 2012/0171991 A1 | 7/2012 | Pham et al. | |
| 2014/0101720 A1 | 4/2014 | Xie et al. | |
| 2015/0249686 A1 | 9/2015 | Xie et al. | |

OTHER PUBLICATIONS

Non-Final Rejection for U.S. Appl. No. 13/649,0796, filed Apr. 9, 2014.

Non-Final Rejection for U.S. Appl. No. 13/649,0796, filed Sep. 12, 2013.

Catalyst 3750 Switch Software Configuration Guide; 2006; Retrieved from the Internet <URL:cisco.com/c/en/us/td/docs/switches/lan/catalyst3750/softwarelrelease/12-2_35_selconfiguration/gu ide/scg .pdf>; pp. 1-36 as printed.

Catalyst 3750-X and 3560-X Switch Getting Started Guide; 2010; Retrieved from the Internet <U RL: cisco.com/c/en/us/td/docs/switches/lan/catalyst3750x_3560x/hardware/quick/guide/3750xgsg.pdf>; pp. 1-22 as printed.

HP Compaq Tablet PC TC11 00; 2005; Retrieved from the Internet <URL: http://h18000.www1.hp.com/products/quickspecs/11755_na/11755_na.pdf; pp. 1-26 as printed.

Software Upgrade Procedure; 2007; Retrieved from the Internet <URL:.cisco .com/c/e n/us/su ppo rtldocs/routers/3800 -se ri es-i nteg rated-se rvices-route rs/ 49044-sw-u pg rade-p roc-ram. htm l >; pp. 1-8 as printed.

Using a Customized HTTP Interface for Router Management; 2008; Retrieved from the Internet <URL:cisco.com/c/en/us/supportldocs/voice-unified-communications/as5300-access-server/15086-ios-command-center.pdf>; pp. 1-4 as printed.

Support and Documentation; 2011; Retrieved from the Internet <URL: web.archive.org/web/2011 0306233529/http://www.cisco.com/cisco/web/supportlindex.html>; pp. 1-2 as printed.

Cisco—appendix C; 2010; Retrieved from the Internet <U RL: cisco.com/c/en/us/td/docs/switches/lan/catalyst3750x_3560x/hardware/instalation/guide/3750x_3560x_HIG/HGcliSET.pdf>; pp. 1-8.

Examiner's Answer to Appeal Brief for U.S. Appl. No. 13/649,079, dated Jul. 16, 2015.

Appeal Brief for U.S. Appl. No. 13/649,079, filed Mar. 8, 2015.

Notice of Allowance for U.S. Appl. No. 13/649,079, dated May 1, 2017.

\* cited by examiner

CONFIGURING INITIAL SETTINGS OF A NETWORK SECURITY DEVICE VIA A HAND-HELD COMPUTING DEVICE

CROSS-REFERENCE TO RELATED APPLICATIONS

This application is a continuation of U.S. patent application Ser. No. 13/649,079, filed Oct. 10, 2012, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2012-2017, Fortinet, Inc.

BACKGROUND

Field

Embodiments of the present invention generally relate to configuring network security devices. In particular, embodiments of the present invention relate to configuring settings of a network security device using a hand-held computing device.

Description of the Related Art

Network security devices have growing application nowadays in distributed communication networks due to rapidly evolving security threats. In order to address the security threats, network security devices provide privacy and security solutions including firewall, Virtual Private Network (VPN), antivirus, Intrusion Prevention (IPS), web filtering, antispam, antispyware, and traffic shaping. These security solutions can be deployed individually or in combination for a comprehensive unified threat management solution. The deployment of the security solution is achieved by configuring the network security devices based on the required solutions. Therefore, it is important to properly configure the network security device so that desired security solutions are achieved.

Initial settings, such as those required to setup a network security device for remote management, often require significant keypad input and are typically configured via a computer system, such as desktop or laptop computer system, having a full-size keyboard. This is achieved by physically connecting the computer system with the network security device using a connecting cable. Software similar to a setup wizard, installed on the computer system may be used to configure initial settings on the network security device. Such software is distributed via physical media, such as CDs or optical disks.

The network security devices may be located in different geographical areas within a communication network. In order to configure these network security devices, a network administrator has to carry a computer system to the various locations, which makes this process cumbersome. Further complicating the process of configuring initial settings is the fact that different network security devices may provide management interfaces implementing different communications standards and/or requiring different physical connectors/cables. Examples of connecting cables include serial cables, having DA, DB, DC, DD and DE sized connectors having 9, 15, 25, 37 and/or 50 pins/sockets, and Ethernet cables (e.g., RJ-45 cables).

In view of the foregoing, there is a need for an improved method of configuring initial settings of network security devices.

SUMMARY

Process, equipment, and computer program product code for configuring a network security device using a hand-held computing device are described. A network administrator using a hand-held computer device, running a mobile application, is prompted by the mobile application to connect the hand-held computer device to a Unified Threat Management (UTM) appliance associated with a protected network that is to be configured for remote configuration/management via the protected network. Responsive to establishment of a physical connection between a Universal Serial Bus (USB) management interface socket of the UTM appliance and a port of the hand-held computer device via a cable having a Universal Serial Bus (USB) A-type connector one end default initial settings of the UTM appliance are displaying by the mobile application to the network administrator via a display of the hand-held computing device. Revisions to or acceptance of the default initial settings are received by the mobile application. The mobile application causes the UTM appliance to be configured to facilitate remote management/configuration of the UTM appliance via the protected network by delivering information regarding the revised or accepted default initial settings to the UTM appliance via the cable.

Other features of embodiments of the present invention will be apparent from the accompanying drawings and from the detailed description that follows.

BRIEF DESCRIPTION OF THE DRAWINGS

Embodiments of the present disclosure are illustrated by way of examples, and not by the way of any limitation, in the figures of the accompanying drawings and in which like reference numerals refer to similar elements and in which.

DETAILED DESCRIPTION

Figure 1:
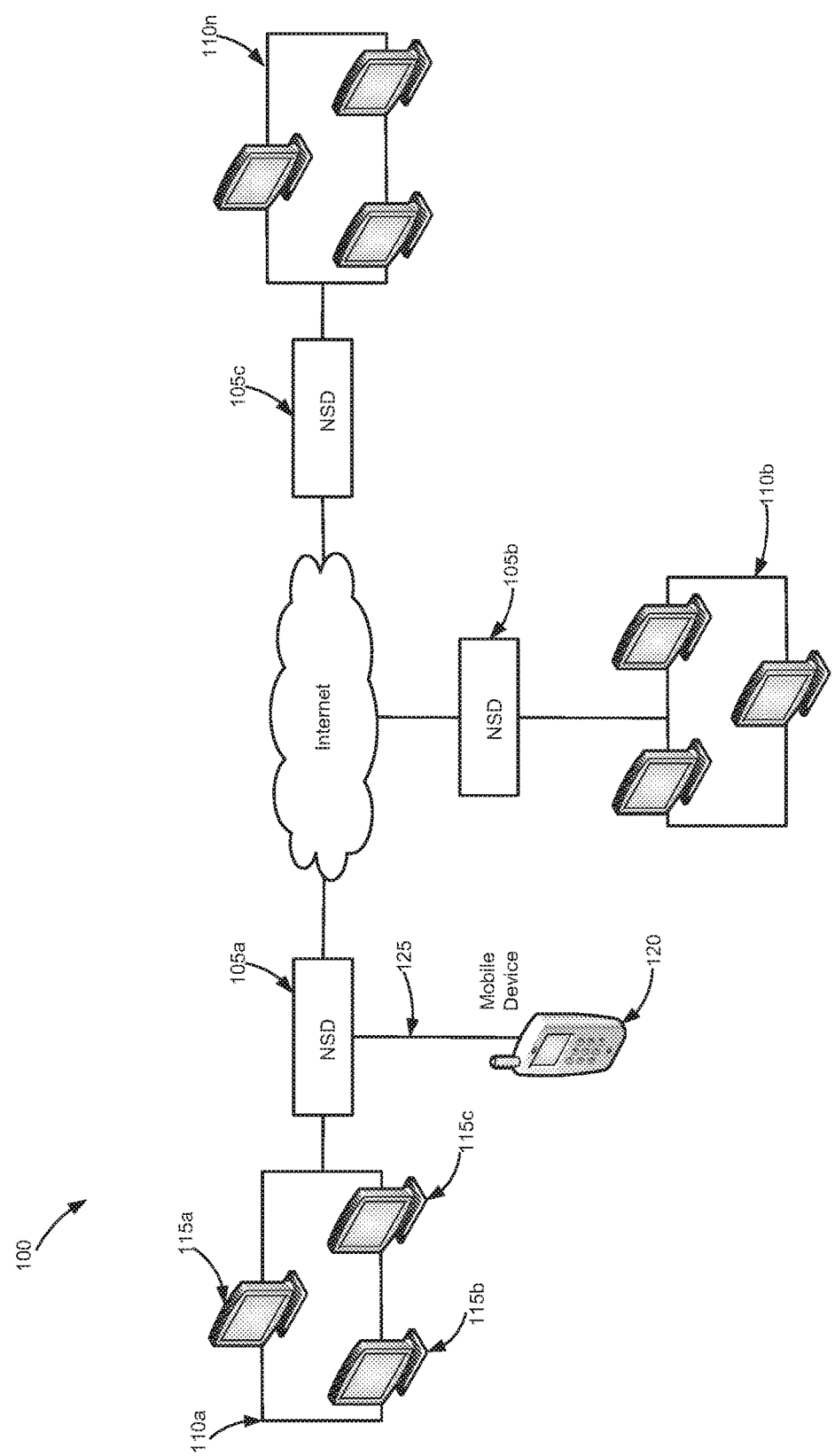
FIG. 1 is a block diagram conceptually illustrating an exemplary environment in which various embodiments of the present invention may be employed.

Systems and methods for configuring a network security device coupled to a communication network are described. In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Embodiments of the present disclosure include various steps, which will be described below. The steps may be performed by hardware components or may be embodied in machine-executable instructions, which may be used to cause a general-purpose or special-purpose processor programmed with the instructions to perform the steps.

Alternatively, the steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

In various embodiments, the article(s) of manufacture (e.g., the computer program products) containing the computer programming code may be used by executing the code directly from the machine-readable storage medium or by copying the code from the machine-readable storage medium into another machine-readable storage medium (e.g., a hard disk, RAM, etc.) or by transmitting the code on a network for remote execution. Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the present disclosure could be accomplished by modules, routines, subroutines, or subparts of a computer program product.

Notably, while embodiments of the present disclosure may be described using modular programming terminology, the code implementing various embodiments of the present disclosure is not so limited. For example, the code may reflect other programming paradigms and/or styles, including, but not limited to object-oriented programming (OOP), agent oriented programming, aspect-oriented programming, attribute-oriented programming (@OP), automatic programming, dataflow programming, declarative programming, functional programming, event-driven programming, feature oriented programming, imperative programming, semantic-oriented programming, functional programming, genetic programming, logic programming, pattern matching programming and the like.

Terminology

Brief definitions of terms used throughout this application are given below.

The term "network security device" generally refers to a hardware device or appliance configured to be coupled to a network and to provide one or more of data privacy, protection, encryption and security. The network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management. load balancing and traffic shaping— that can be deployed individually as a point solution or in various combinations as a unified threat management (UTM) solution. Non-limiting examples of network security devices include proxy servers, firewalls, VPN appliances, gateways, UTM appliances and the like.

The term "communication network" generally refers to a telecommunications network which is a collection of terminals, links, and nodes which connect together to enable communication between users of the terminals. The communication network can be a Local Area Network (LAN), Wide Area Network (WAN), the Internet, a Metropolitan Area Network (MAP), Mobile (GSM) network, a Code Division Multiplexing Access (CDMA) network, and a Public Switched Telephone Network (PSTN).

The term "node" generally refers to a connection point in a communication device. Node is an electronic device attached in a communication network which is capable of sending, receiving, or forwarding information over the communication network. The node can be a computer system, a laptop, a workstation, a handheld computer, a mobile phone, a mobile computing device, a personal digital assistant (PDA), a server, a client machine, a virtual machine, a router, and a switch.

The term "hand-held computing device" generally refers to a mobile computing device. Non-limiting examples of hand-held devices include cellular phones, personal digital assistants (PDAs), smartphones (Android-based, iOS-based, Windows Mobile-based, Windows Phone-based, Black-Berry OS-based and the like) and tablet computers (Android-based, iOS-based, Windows-based, BlackBerry OS-based and the like).

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

If the specification states a component or feature "may", "can", "could", or "might" be included or have a characteristic, that particular component or feature is not required to be included or have the characteristic.

FIG. 1 is a block diagram conceptually illustrating an exemplary environment 100 in which various embodiments of the present invention may be employed. As shown, environment 100 includes one or more Network Security Devices (NSDs), such as a network security device 105a, a network security device 105b, and a network security device 105c. Each network security device 105a-c is connected to a communication network, such as communication network 110a, communication network 110b, and communication network 110n, for which the network security device provides security based solutions.

Each network security device 105a-c is a hardware platform that protects the associated communication network 110a-n against various security threats. Examples of security threats include, but are not limited to, email spamming, inappropriate web content, worms, trojans, viruses, sophisticated intrusions, simple intrusions, denial of service attacks and so forth. In order to protect against these security threats, network security devices 105a-c provide various features and adopt various security measures, such as, firewall, antivirus, Intrusion Prevention System (IPS), Virtual Private Network (VPN) layer, Secure Sockets Layer (SSL), data loss control, vulnerability management, Internet Protocol version 6 (IPv6) support, Voice over Internet Protocol (VoIP) support, web filtering, antispam, antispyware, Wide Area Network (WAN) optimization, web caching, traffic shaping, and so forth. These security measures ensure data and device security in communication networks 110a-n.

In communication network 110a, network security device 105a may be enabled as a gateway device (e.g., a FORTI-GATE gateway device available from Fortinet, Inc. of Sunnyvale, Calif.).

Apart from network security device 105a, communication network 110a also includes a plurality of nodes, such as node 115a, node 115b, and node 115c. Examples of a node may include a computer system, a laptop, a workstation, a handheld computer, a mobile phone, a mobile computing device, a personal digital assistant (PDA), a server, a client machine, a virtual machine, a router, a switch, and so forth. Nodes 115a-c are connected to form communication network 110a. Examples of communication network 110a include, but are not limited to, a Local Area Network (LAN), Wide Area Network (WAN), the Internet, a Metropolitan Area Network (MAN), and the like or a mobile network. It may be understood that the mobile network may be a Global System for Mobile (GSM) network, a Code Division Multiplexing Access (CDMA) network, a Public Switched Telephone Network (PSTN), and the like.

Nodes 115a-c communicate by transmitting data packets within communication network 110a. These data packets are observable by network security device 105a. Network security device 105a may deploy security measures, such as a UTM profile for scanning the data packets. UTM refers to a comprehensive security solution able to perform multiple security functions with scanning possible for all major security threats known in a communication network.

Network security device 105a may facilitate a variety of data privacy, protection, encryption and security measures to be applied/verified against the data packets transmitted within communication network 110a. Network security device 105a may detect unauthorized or undesired data packets while scanning. For example, data packets may contain malicious content, such as viruses and/or worms, may be unauthenticated, may include errors in fields, or may be part of a Distributed Denial of Services (DDoS) attack. Responsive to detecting a malicious data packet, network security device 105a may be configured to further implement security measures against the threat. The configuration for network security device 105a is typically established during installation of network security device 105a within communication network 110a. In the context of the present example, rather than requiring the network administrator to bring a laptop or desktop computer system, network security device 105a is configurable via a hand-held computing device 120. Examples of hand-held computing device 120 include, but are not limited to, a cellular phone, a personal digital assistant (PDA), a smart phone, and a tablet.

According to one embodiment, network security device 105a can be coupled in communication with hand-held computing device 120 using a connecting cable 125. Examples of connecting cable 125 include RJ-45 serial cable, DB-9 serial cable, Universal Serial Bus (USB) cable (e.g., USB A-type to USB B-type, USB A-type to micro-USB A or USB A-type to micro-USB B male/female adapter), iPhone/iPad connector cables (e.g., the new eight-pin Lightning connector introduced with the iPhone 5 or the prior 30-pin dock connector), and so forth. Connecting cable 125 has two ends wherein one end is connected to hand-held computing device 120 and other end is connected to network security device 105a. In one embodiment, network security device 105a includes a USB management interface a USB A-type female socket for receiving a USB A-type male connector.

Once, network security device 105a and hand-held computing device 120 are connected using connecting cable 125, network security device 105a is configured using an application available on hand-held computing device 120. According to one embodiment the application is a mobile app available through an application distribution platform (e.g., the Apple App Store, Google Play, the Amazon Appstore, the Windows Phone Marketplace and/or BlackBerry App World).

In one embodiment, the application provides a graphical touchscreen-based user interface for configuring network security device 105a. Various screens are included in the application to configure network security device 105a in a step-by-step manner. Using the application, different models of network security device 105a can be configured on the same hand-held computing device 120. The application enables configuring various initial settings of network security device 105a. Further, other network security devices, such as network security device 105b and network security device 105c may also be configured using hand-held computing device 120.

Hand-held computing devices are portable and can be easily carried to the location of network security devices 105a-c. Therefore, the need to carry desktops or laptops with an application for configuring the initial settings of network security devices can be avoided. Further, updating configuration with changes in software of network security devices can be easily done as and when required.

Figure 2:
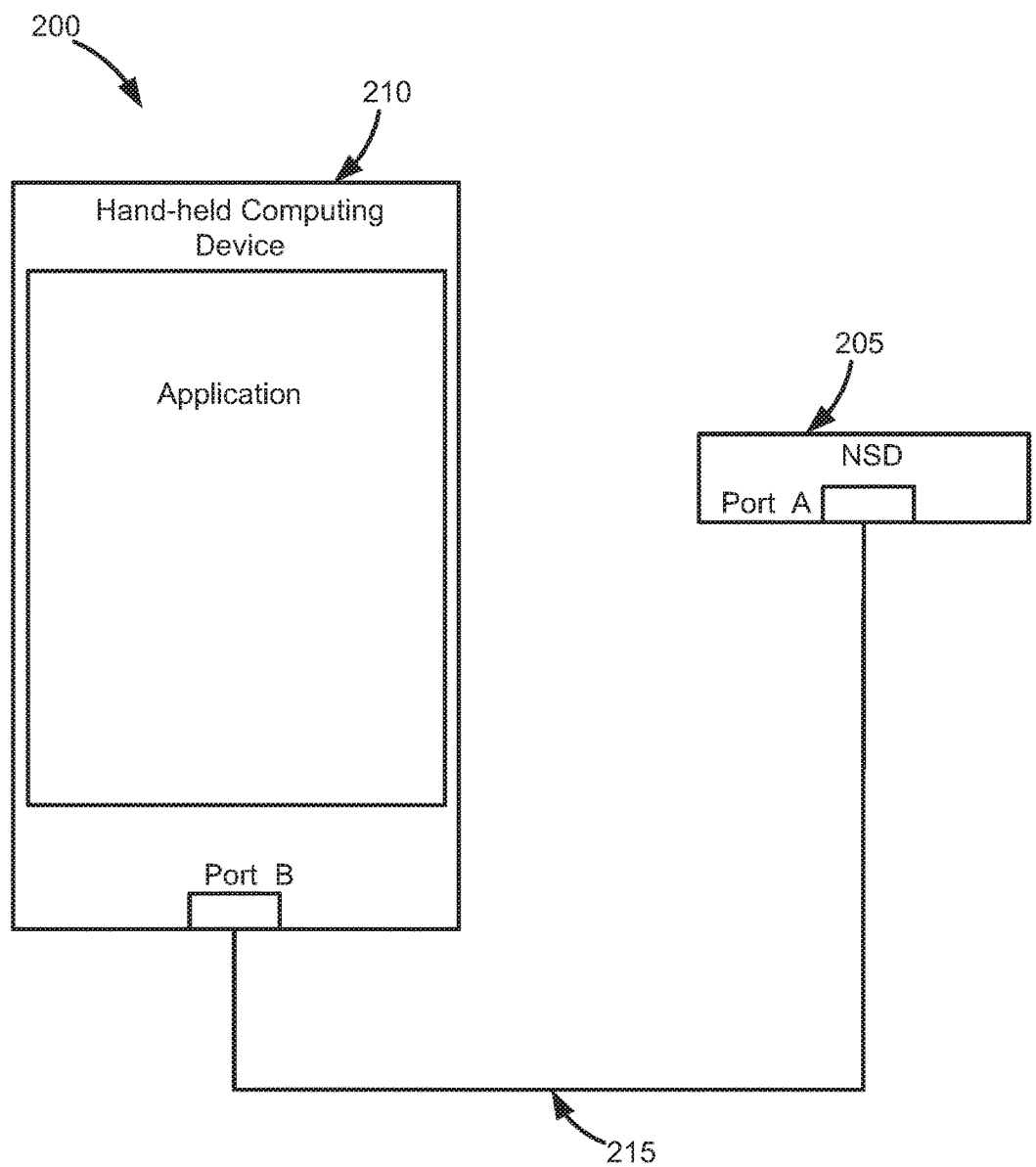
FIG. 2 is a block diagram illustrating a hand-held computing device coupled to a network security device via a connecting cable in accordance with an embodiment of the present invention.

FIG. 2 is a block diagram illustrating components for configuring a network security device 205 in accordance with an embodiment of the present invention. As shown, environment 200 includes network security device 205 coupled to a hand-held computing device 210 using a connecting cable 215.

Connecting cable 215 enables connection between network security device 205 and hand-held computing device 210 by coupling one end with network security device 205 and the other end with hand-held computing device 210. In an embodiment, connecting cable 215 is a standard USB type 'A' to 'B' cable. In another embodiment, connecting cable 215 includes a lightning connector or a 30-pin iPhone/ iPad dock connector on one end and a standard USB A-type connector on the other end. Using connecting cable 215, a connection between network security device 205 and hand-held computing device 210 is established. Responsive to the connection being established, an initial settings configuration application is activated on hand-held computing device 210. The application provides a graphical user interface for configuring network security device 205. Various screens are included in the application to configure initial settings of network security device 205 in a step-by-step manner, so as to allow subsequent remote management.

The application is a software module stored in memory of hand-held computing device 210. The application may be downloaded, purchased or distributed via an online app store or website. In present business environment, each manufacturer or distributor of a particular mobile device brand provides a store dedicated to that brand. Popular examples include Apple's iPhone App Store, RIM's Blackberry App World, Nokia's Ovi Store, Palm's webOS App Catalog, and so forth. Alternately, the application may be transferred to hand-held computing device 210 from a computer system on which the application is already available.

A user interface of the application may involve receiving user input via a keyboard (e.g., a virtual or physical QWERTY keyboard layout) or a touchscreen interface (via selection of entries of drop-down lists, radio buttons, check boxes and the like) of hand-held computing device 210.

In an embodiment, the user interface of the application is based on a touch screen type interface of hand-held computing device 210 and is designed to minimize typing. The user interface presents multiple screens which include one or more graphical icons, to a user. These icons are selected for configuring network security device 205. In order to improve the user interface, the one or more icons displayed at one time on the user interface may be arranged in a single screen such that scrolling of the screen may be avoided. Further, fewer alpha-numeric inputs, clicks or touch inputs are required as a result of providing default values and multiple device configuration features. Therefore, the user interface enables easy and faster configuration of network security device 205.

In another embodiment, the user interface of the application is designed based at least in part on keypad type interface (virtual or physical) of hand-held computing device 210. The user interface presents a form with options for configuring network security device 205. In order to improve the user interface, the form and options may be designed such that visibility of the form is maintained in one screen and scrolling is avoided. For example, as described further below, in one embodiment, various sections and/or subsections of an input form may be expanded to interact with the settings at issue and then collapsed when the settings have been completed. Further, fewer options may be provided so that the user may configure network security device 205 easily and effectively.

For purposes of illustrating an exemplary use case, in the following discussion it is assumed that network security device 205 is a FortiGate® gateway device and hand-held computing device 210 is an iPhone smartphone. As such, initial settings of the gateway device are described as being configured using an app running on the iPhone. As described above, a physical connection between the gateway device and the iPhone is first established using a standard iPhone/iPad connector having a 30-pin dock connector on one end and a USB A-type connector on the other end. Thereafter, a mobile application is invoked in the iPhone to configure initial settings of the gateway device. Herein, the mobile application may be referred to as the FortiExplorer App. The mobile application provides various screens through which initial settings of the gateway device are configured. As a result, the gateway device is configured and accessible via the communication network to which it is connected for additional remote configuration/management. The application and process of installation is explained in further in detail with reference to in conjunction with FIGS. 4A-F.

Figure 3:
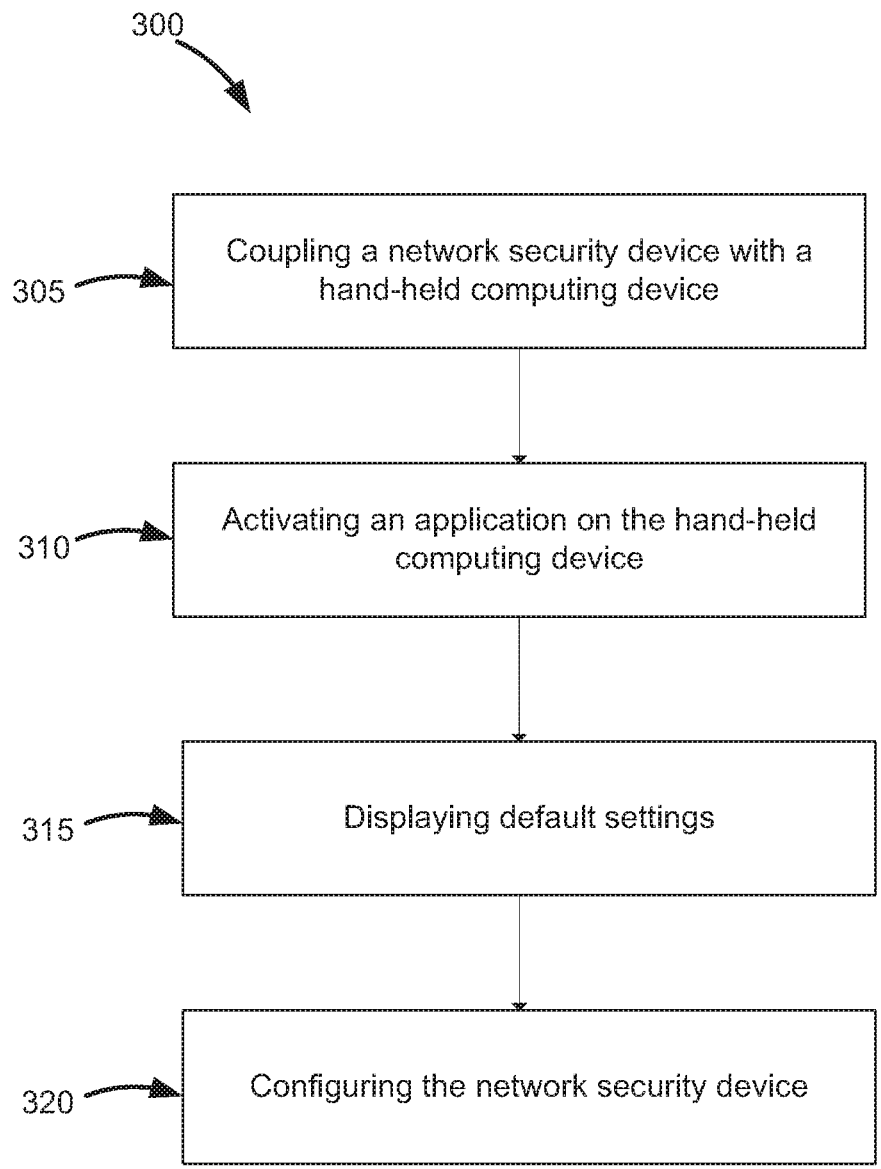
FIG. 3 is a flow diagram illustrating a method for configuring initial settings of a network security device in accordance with an embodiment of the present invention.

FIG. 3 is a flow diagram illustrating a method 300 for configuring a network security device. At step 305, the network security device is coupled to a hand-held computing device using a connecting cable. The connecting cable enables connection between the network security device and the hand-held computing device by coupling a first end with the network security device and the second end with the hand-held computing device. As mentioned in conjunction with FIG. 1 and FIG. 2, any standard known connecting cable may be used for this purpose. The connecting cable may be USB type A to B cable. Alternately, the connecting cable may be based on ports of the network security device and the hand-held computing device.

As the connection between the network security device and the hand-held computing device is established, an application is activated in the hand-held computing device, at step 310. The application provides a graphical user interface for configuring network security device 205. Various screens are included in the application to configure initial settings of network security device 205 in a step-by-step manner. The application is capable of detecting model and device details of the network security device. Further, the application is capable of detecting default settings of the network security device. These default settings of the network security device are displayed to a user at step 315. According to one embodiment, to reduce typing input required of the network administrator, the application retrieves the Internet Protocol (IP) address, the default gateway and one or more Domain Name Server (DNS) addresses through Dynamic Host Configuration Protocol (DHCP) from a DHCP server associated with the communications network to which the gateway device is attached. These retrieved values can be set as default values and presented to the user to be revised or accepted as appropriate.

Thereafter, configuration of the network security device is performed by accepting inputs from the user at step 320. The user provides inputs about continuing with or changing the default settings using the screens of the application. The steps of configuration and screens are further explained in detail in conjunction with FIGS. 4A-F.

FIGS. 4A-4F illustrate a user interface in a hand-held computing device for configuring a network security device. Examples of the hand-held computing device and the network security device have been explained in detail above with reference to FIG. 1 and FIG. 2. Responsive to the hand-held computing device being coupled in connection with a USB management interface of the network security device, an application on the hand-held computing device is activated. In an embodiment, the application recognizes the network security device. For example, in the illustrated embodiment, the network security device is recognized by the application as a FortiGate® gateway device with device number FWV80S3910600015. Further, multiple screens are provided with one or more graphical input mechanisms by which the network security device is configured. It can be observed that the user interface of the application is designed for a touch screen type of hand-held computing device.

Figure 4A:
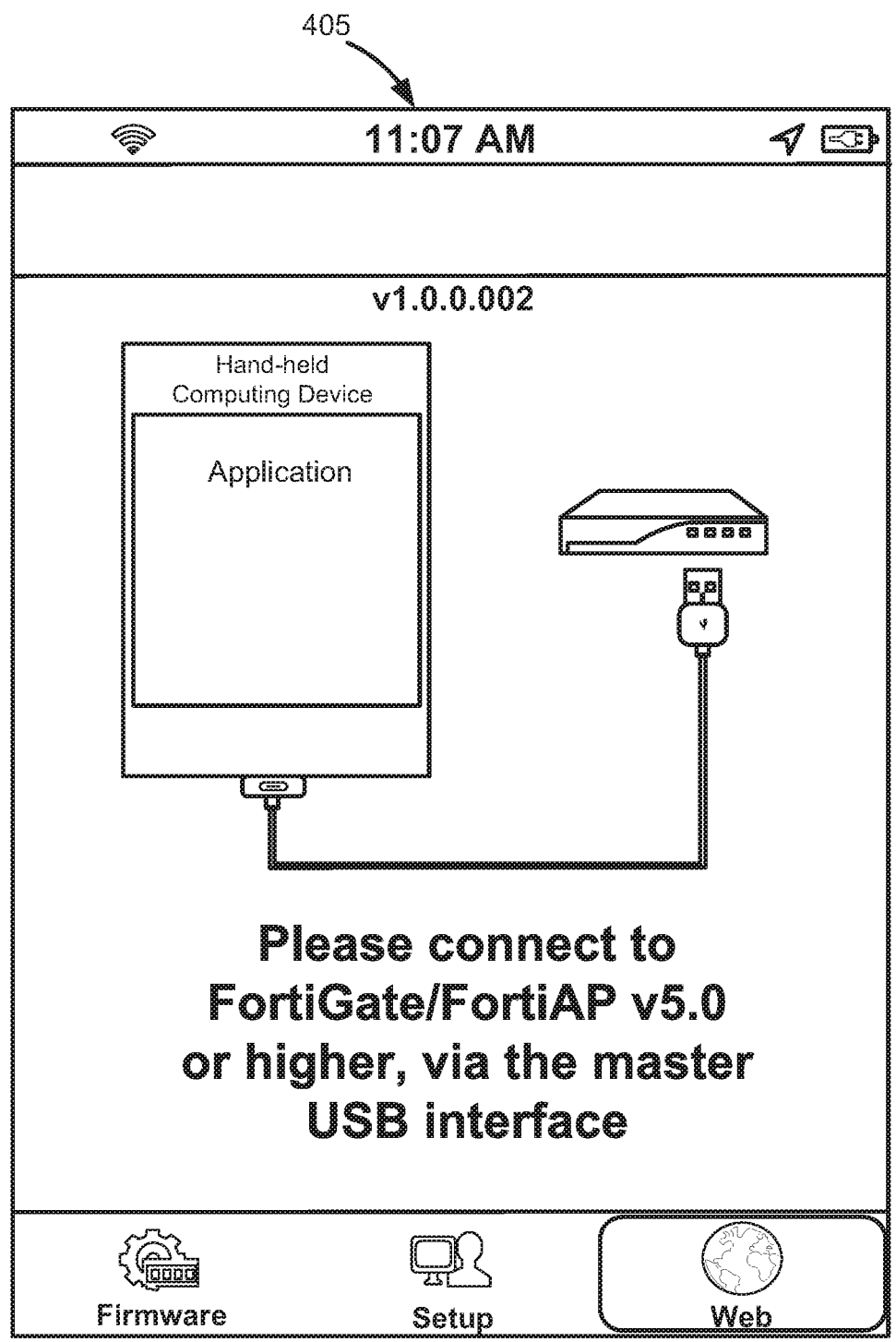
FIGS. 4A-4F illustrate various features of a user interface of a mobile application for configuring initial settings of a network security device in accordance with an embodiment of the present invention.

FIG. 4A displays a splash screen 405 which may be launched as the application on the hand-held computing device is activated. The splash screen prompts the user to connect the hand-held computing device to a network security device using a connecting cable. When the network security device is detected by the hand-held device, an authentication screen pops up, an example of which is show in FIG. 4B.

Figure 4B:
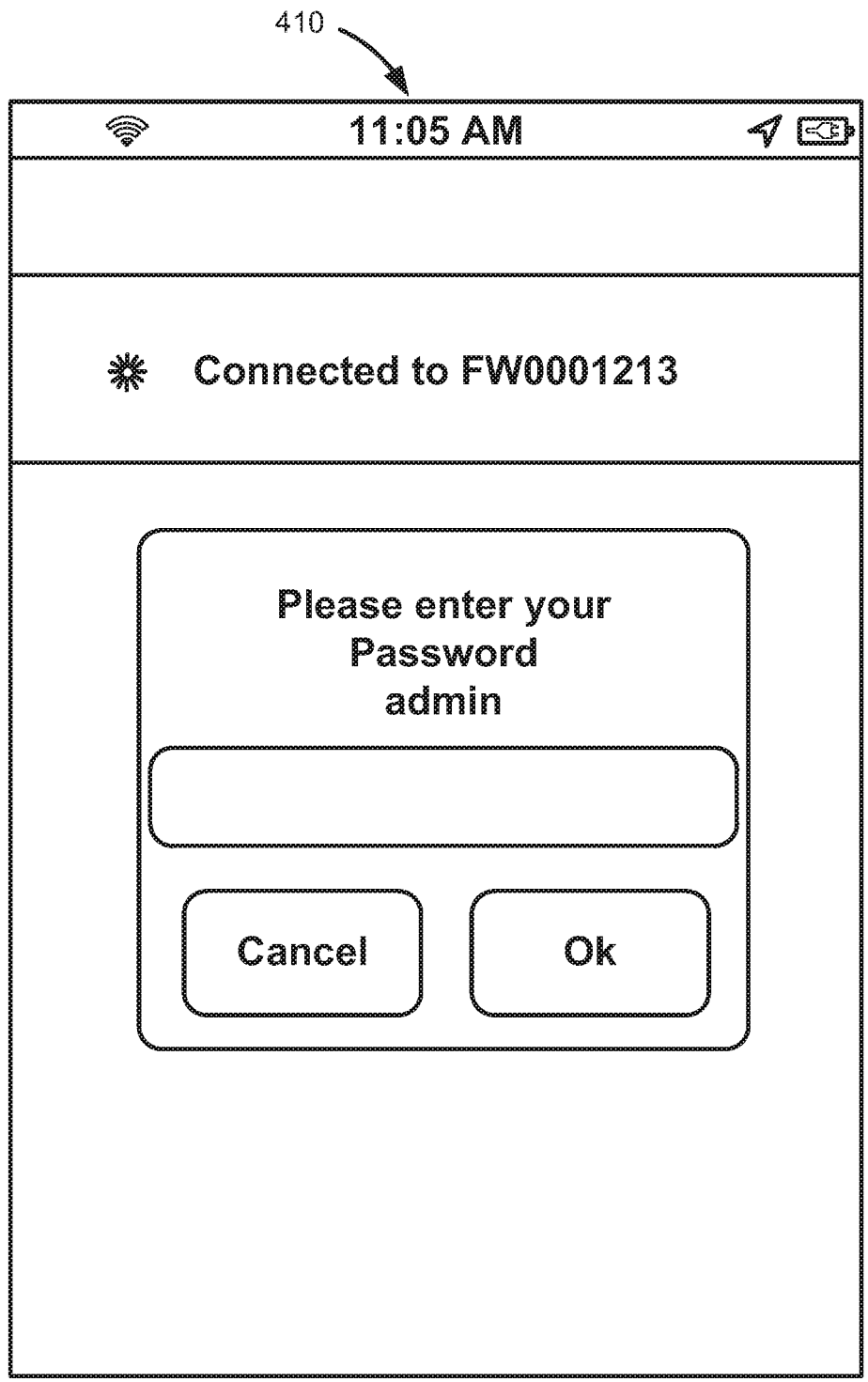
Figure 4C:
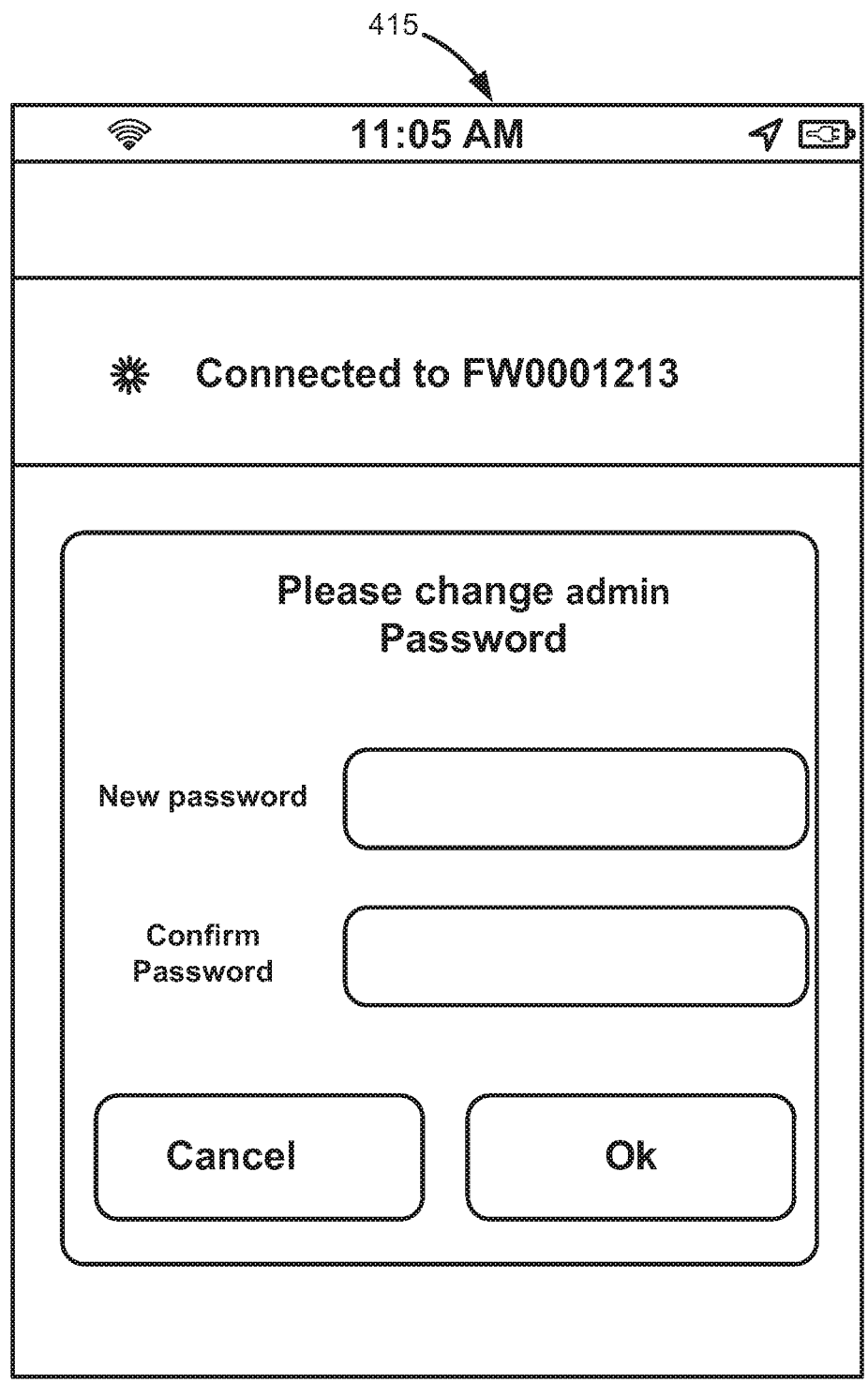

As shown in FIG. 4B, an authentication screen 410 is provided through which a user is required to provide the password for admin login. By default, admin login is selected and the user is required to only enter the password to login. Other options like admin name, device name, etc. are selected by default. Therefore, the total number of clicks/touch entry is reduced.

According to one embodiment, initially, the admin password may be blank by default. Once the user selects the "Ok" button, a password change screen 415 is provided such as that shown in FIG. 4C. The password may be changed by the user to set a new admin password. The user may skip this step as well.

Figure 4D:
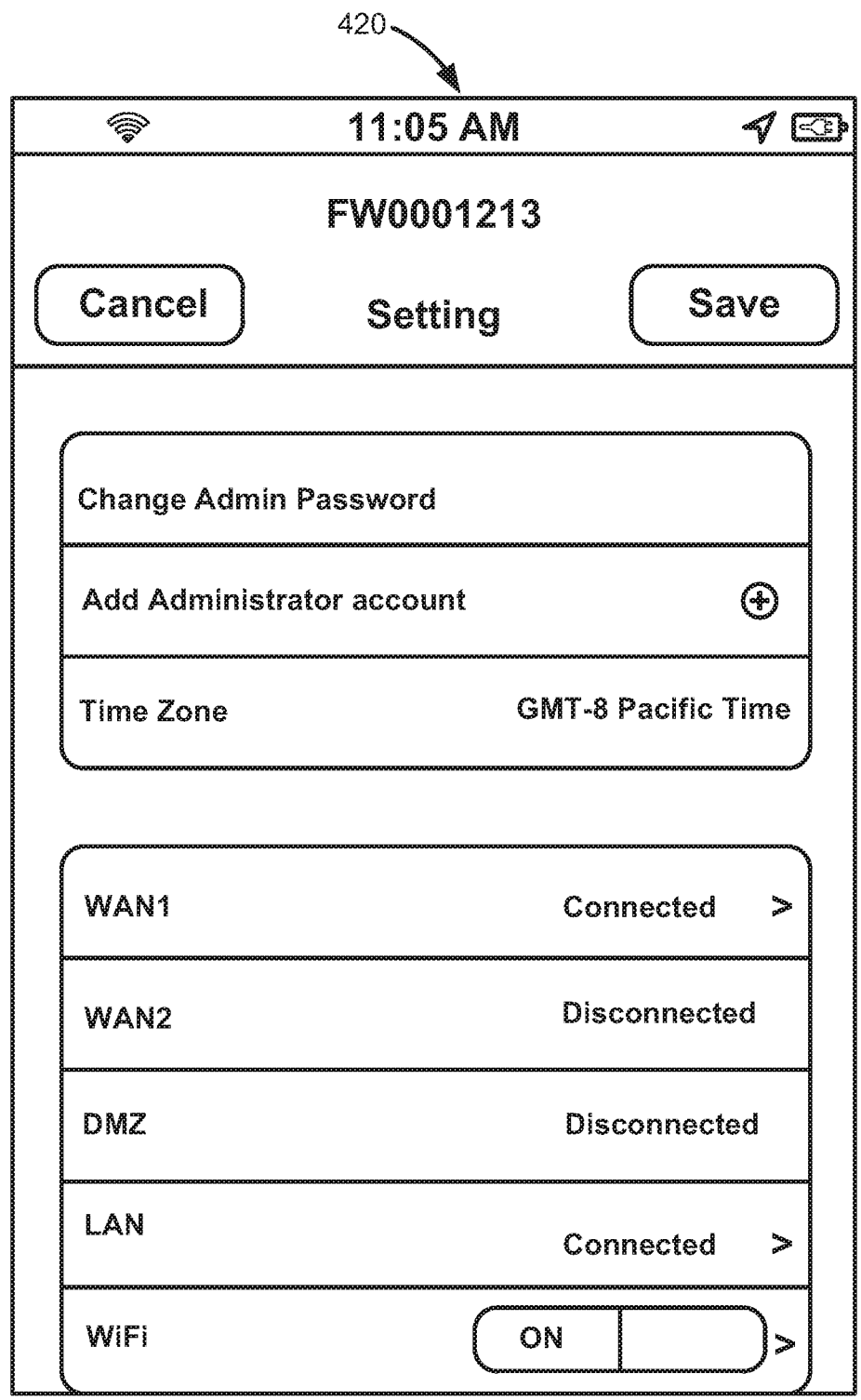

Thereafter, a settings screen 420 is provided, as shown in FIG. 4D. Settings screen 420 enables configuration of the network security device. Settings screen 420 includes graphical input mechanisms which may be selected to configure the network security device. Examples of the graphical input mechanisms shown in FIG. 4D are Change Admin Password, Add Administrator account, Time Zone, and active/inactive connections. Using the graphical input mechanism Change Admin Password, a user may change admin password for login to the application. Selection of this graphical input mechanism results in the display of password change screen 415 as discussed with reference to FIG. 4C.

Graphical input mechanism, Add Administrator account enables addition of another admin account. This graphical input mechanism may be selected by a user to add a new admin ID and password that can be used to log into the network security device being configured. Another graphical input mechanism, Time Zone may be selected to change time settings of the network security device. According to one embodiment, in order to reduce the need for user input, the default time zone is read by the application using time settings of the hand-held computing device which are already set. This may be changed by the user through Time Zone graphical input mechanism.

In the present example, settings screen 420 also displays active and inactive connections to the network security device. For example, it can be observed in FIG. 4D that by default WAN1 and LAN connections are active and the Wi-Fi connection is ON. Other connections like WAN2 and DMZ are inactive. The inactive connections may be activated by the user by providing click/touch input in the corresponding graphical input mechanisms.

Figure 4E:
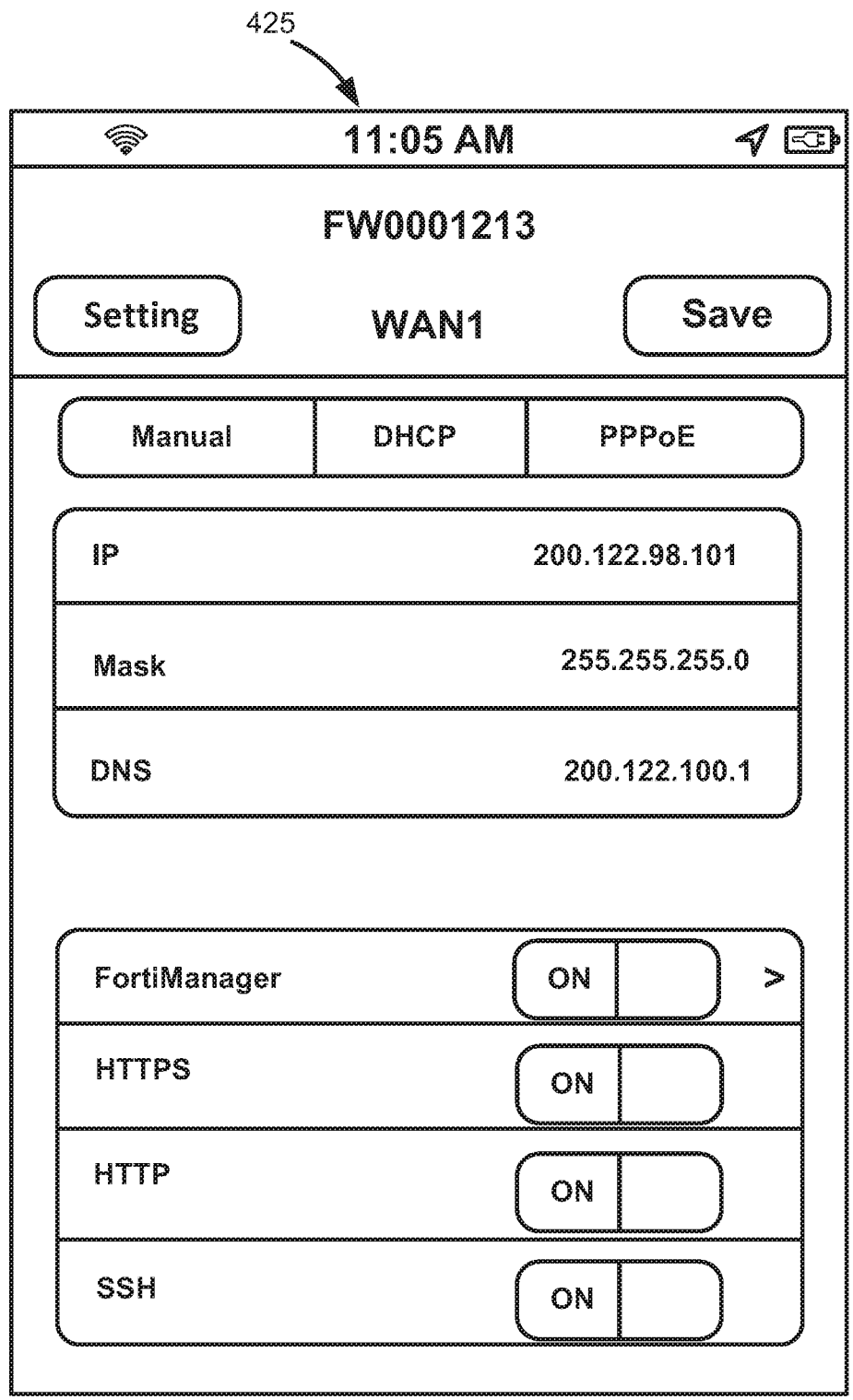

The connections identified at the network security device may be individually configured by the user. For example, settings of connection WAN1 may be configured by using a WAN settings screen 425 as shown in FIG. 4E.

The settings identified by the application as default values are displayed on WAN settings screen 425. The application retrieves these default settings through Dynamic Host Configuration Protocol (DHCP). DHCP is a network configuration protocol for hosts on Internet Protocol (IP) networks and provides configuration information, particularly the IP addresses of local Domain Name Server (DNS), network boot servers, or other service hosts. This again reduces the number of clicks/touch entries required for configuration. The user may provide entry only if changes from the default settings are required. For example, IP address, Mask address, and DNS address as identified by default are displayed on WAN setting screen 425. A user may change one or more of these default values if required. Further, protocols active for the network security device are also displayed. A user may add/delete the permitted protocols for the network security device.

Figure 4F:
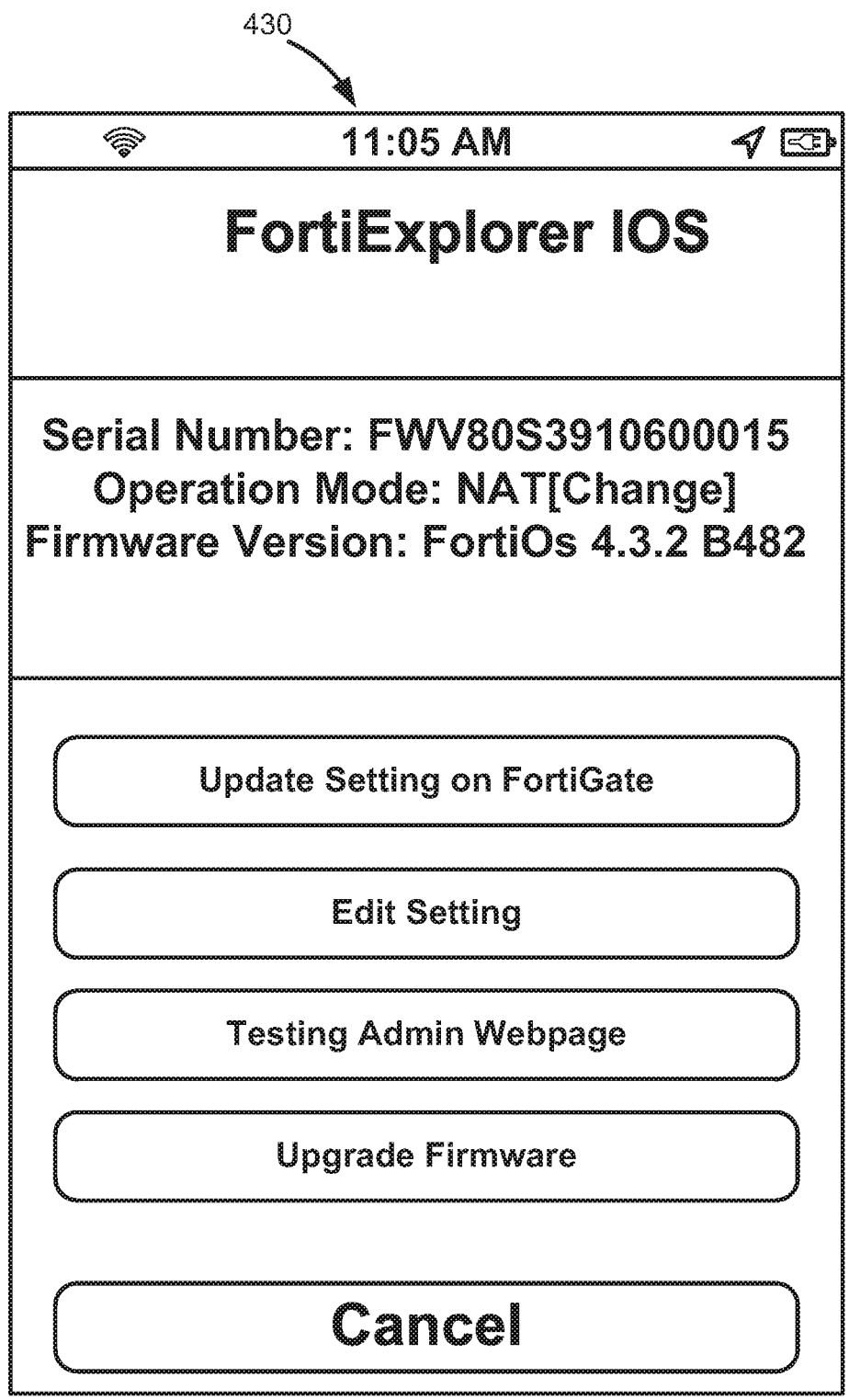

FIG. 4F displays a home screen 430 of the application. In the present example, home screen 430 displays multiple graphical icons/buttons which may be used to edit/update various initial settings of the network security device. In the present example, graphical icons for updating/editing the settings are included. Further, a graphical icon for testing settings of the network security device is included. In addition, a graphical icon for upgrading the firmware of the network security device is included.

According to one embodiment, the application may subscribe to firmware releases on a per network security device model basis. For example, if the user subscribes to receive alerts relating to new firmware releases for the FG-300C model gateway device, then, each time a new firmware release is made for the FG-300C model gateway device an alert and corresponding link can be displayed from which the new firmware release can be downloaded to the hand-held computing device. Once new firmware releases are stored on the hand-held computing device, the application may be used to perform a firmware upgrade of the network security device by selecting the "Upgrade Firmware" button of FIG. 4F. According to one embodiment, responsive to selection of the "Upgrade Firmware" button, the application verifies whether the network security device has a valid support license. If so, then, the application upgrades the network security device's firmware by uploading the new firmware release to the network security device.

In addition, one or more network security device profiles may be displayed on home page 430. In the present example, the profile item shows the serial number of the network security device and the firmware version. The profile item may also display additional information, such as the model of the network security device and the WAN IP address. In one embodiment, selecting the profile item launches the web browser of the hand-held computing device with a URL to the admin login page of the configured network security device. This enables the user to test/trouble shoot the initial configuration of the network security device. In one embodiment, a long hold of the profile item pops up a context menu with "New", "Edit," "Delete" and "Copy" options thereby enabling the user to create multiple profiles. This feature provides a convenient way for IT staff to set up a batch of network security devices in a lab, for example.

Various embodiments of the invention provide efficient method, system, and computer program product code for configuring the network security devices. As hand-held computing devices are used for configuring, there is no longer a requirement to carry a dedicated desktop or laptop to the location at which the network security device to be configured resides. Further, the mobile application included in the hand-held computing device is designed such that number of inputs required for configuring the network security device is reduced.

What is claimed is:

1. A method comprising:
   prompting, by a mobile application running on a hand-held computer device, a network administrator using the hand-held computer device to connect the hand-held computer device to a Unified Threat Management (UTM) appliance associated with a protected network that is to be configured for remote configuration/management via the protected network;

responsive to establishment of a physical connection between a Universal Serial Bus (USB) management interface socket of the UTM appliance and a port of the hand-held computer device via a cable having a Universal Serial Bus (USB) A-type connector on one end, displaying, by the mobile application, default initial settings of the UTM appliance to the network administrator via a display of the hand-held computing device;

receiving, by the mobile application, revisions to or acceptance of the default initial settings; and causing the UTM appliance to be configured to facilitate remote management/configuration of the UTM appliance via the protected network by delivering, by the mobile application, information regarding the revised or accepted default initial settings to the UTM appliance via the cable.

2. The method of claim 1, wherein the default initial settings comprise one or more of an Internet Protocol (IP) address of the UTM appliance, information identifying a default gateway for the UTM appliance and one or more Domain Name Server (DNS) addresses to be used by the UTM appliance.

3. The method of claim 2, wherein the default initial settings are received from a Dynamic Host Configuration Protocol (DHCP) server associated with the protected network.

4. The method of claim 1, further comprising:

when a new firmware release is available for the UTM appliance, receiving, by the mobile application, an alert regarding availability of the new firmware release;

storing the new firmware release within a memory of the hand-held computing device by downloading, by the mobile application, the new firmware release; and performing, by the mobile application, a firmware upgrade of the UTM appliance by uploading the new firmware release from the memory of the hand-held computing device to the UTM appliance via the cable.

5. The method of claim 1, further comprising after the UTM appliance has been configured with the revised or accepted default initial settings, allowing the network administrator to test the UTM appliance by responsive to selection of a profile item displayed on a home page of the mobile application, launching a web browser of the hand-held computing device with a uniform resource locator (URL) of an admin login page of the UTM appliance.

6. The method of claim 1, further comprising responsive to receiving an indication regarding whether the UTM appliance is permitted to use a particular protocol causing, by the mobile application, the UTM appliance to enable/disable the particular protocol.

7. The method of claim 1, wherein the hand-held computing device comprises a smartphone.

8. The method of claim 1, wherein the display comprises a touch-screen display.

9. A hand-held computing device comprising:

a display;

non-transitory storage device having embodied therein instructions representing a mobile application; and one or more processors coupled to the non-transitory storage device and operable to execute the mobile application to perform a method comprising:

prompting a network administrator using the hand-held computer device to connect the hand-held computer device to a Unified Threat Management (UTM) appliance associated with a protected network that is to be configured for remote configuration/management via the protected network;

responsive to establishment of a physical connection between a Universal Serial Bus (USB) management interface socket of the UTM appliance and a port of the hand-held computer device via a cable having a Universal Serial Bus (USB) A-type connector on one end, displaying default initial settings of the UTM appliance to the network administrator via a display of the hand-held computing device;

receiving revisions to or acceptance of the default initial settings; and causing the UTM appliance to be configured to facilitate remote management/configuration of the UTM appliance via the protected network by delivering information regarding the revised or accepted default initial settings to the UTM appliance via the cable.

10. The hand-held computing device of claim 9, wherein the default initial settings comprise one or more of an Internet Protocol (IP) address of the UTM appliance, information identifying a default gateway for the UTM appliance and one or more Domain Name Server (DNS) addresses to be used by the UTM appliance.

11. The hand-held computing device of claim 10, wherein the default initial settings are received from a Dynamic Host Configuration Protocol (DHCP) server associated with the protected network.

12. The hand-held computing device of claim 9, wherein the method further comprises:

when a new firmware release is available for the UTM appliance, receiving an alert regarding availability of the new firmware release;

storing the new firmware release within a memory of the hand-held computing device by downloading the new firmware release; and performing a firmware upgrade of the UTM appliance by uploading the new firmware release from the memory of the hand-held computing device to the UTM appliance via the cable.

13. The hand-held computing device of claim 9, wherein the method further comprises after the UTM appliance has been configured with the revised or accepted default initial settings, allowing the network administrator to test the UTM appliance by responsive to selection of a profile item displayed on a home page of the mobile application, launching a web browser of the hand-held computing device with a uniform resource locator (URL) of an admin login page of the UTM appliance.

14. The hand-held computing device of claim 9, wherein the method further comprises responsive to receiving an indication regarding whether the UTM appliance is permitted to use a particular protocol causing the UTM appliance to enable/disable the particular protocol.

15. A non-transitory computer-readable storage medium embodying a set of instructions representing a mobile application, which when executed by one or more processors of a hand-held computing device, cause the one or more processors to perform a method comprising:

prompting a network administrator using the hand-held computer device to connect the hand-held computer device to a Unified Threat Management (UTM) appliance associated with a protected network that is to be configured for remote configuration/management via the protected network;

responsive to establishment of a physical connection between a Universal Serial Bus (USB) management interface socket of the UTM appliance and a port of the hand-held computer device via a cable having a Universal Serial Bus (USB) A-type connector on one end, displaying default initial settings of the UTM appliance to the network administrator via a display of the hand-held computing device;

receiving revisions to or acceptance of the default initial settings; and causing the UTM appliance to be configured to facilitate remote management/configuration of the UTM appliance via the protected network by delivering information regarding the revised or accepted default initial settings to the UTM appliance via the cable.

16. The non-transitory computer-readable storage medium of claim 15, wherein the default initial settings comprise one or more of an Internet Protocol (IP) address of the UTM appliance, information identifying a default gateway for the UTM appliance and one or more Domain Name Server (DNS) addresses to be used by the UTM appliance.

17. The non-transitory computer-readable storage medium of claim 16, wherein the default initial settings are received from a Dynamic Host Configuration Protocol (DHCP) server associated with the protected network.

18. The non-transitory computer-readable storage medium of claim 15, wherein the method further comprises:

when a new firmware release is available for the UTM appliance, receiving an alert regarding availability of the new firmware release;

storing the new firmware release within a memory of the hand-held computing device by downloading the new firmware release; and performing a firmware upgrade of the UTM appliance by uploading the new firmware release from the memory of the hand-held computing device to the UTM appliance via the cable.

19. The non-transitory computer-readable storage medium of claim 15, wherein the method further comprises after the UTM appliance has been configured with the revised or accepted default initial settings, allowing the network administrator to test the UTM appliance by responsive to selection of a profile item displayed on a home page of the mobile application, launching a web browser of the hand-held computing device with a uniform resource locator (URL) of an admin login page of the UTM appliance.

20. The non-transitory computer-readable storage medium of claim 15, wherein the method further comprises responsive to receiving an indication regarding whether the UTM appliance is permitted to use a particular protocol causing the UTM appliance to enable/disable the particular protocol.

* * * * *